(12) United States Patent
Noh et al.

(10) Patent No.: US 9,264,262 B2
(45) Date of Patent: Feb. 16, 2016

(54) METHOD AND APPARATUS FOR TRANSMITTING APERIODIC SOUNDING REFERENCE SIGNAL IN WIRELESS COMMUNICATION SYSTEM

(75) Inventors: Min Seok Noh, Anyang-si (KR); Jae Hoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 108 days.

(21) Appl. No.: 13/995,043

(22) PCT Filed: Dec. 19, 2011

(86) PCT No.: PCT/KR2011/009766
§ 371 (c)(1),
(2), (4) Date: Jun. 17, 2013

(87) PCT Pub. No.: WO2012/081948
PCT Pub. Date: Jun. 21, 2012

(65) Prior Publication Data
US 2013/0265978 A1      Oct. 10, 2013

Related U.S. Application Data

(60) Provisional application No. 61/424,060, filed on Dec. 17, 2010.

(51) Int. Cl.
*H04W 72/04* (2009.01)
*H04L 25/02* (2006.01)
*H04L 5/00* (2006.01)

(52) U.S. Cl.
CPC .......... *H04L 25/0224* (2013.01); *H04L 5/0051* (2013.01); *H04W 72/042* (2013.01); *H04L 5/0078* (2013.01); *H04L 5/0091* (2013.01)

(58) Field of Classification Search
None
See application file for complete search history.

(56) References Cited

U.S. PATENT DOCUMENTS

| 2009/0122771 | A1  | 5/2009  | Cai |
|---|---|---|---|
| 2010/0232473 | A1* | 9/2010  | Nakao et al. .................. 375/130 |
| 2010/0284359 | A1  | 11/2010 | Kim et al. |
| 2011/0096815 | A1* | 4/2011  | Shin et al. ..................... 375/219 |
| 2011/0268028 | A1* | 11/2011 | Stern-Berkowitz et al. .. 370/328 |
| 2012/0033643 | A1  | 2/2012  | Noh et al. |

(Continued)

FOREIGN PATENT DOCUMENTS

| KR | 10-2005-0121136 A | 12/2005 |
|---|---|---|
| KR | 10-2009-0088273 A | 8/2009 |

(Continued)

OTHER PUBLICATIONS

3GPP, Paragraph 4.2, Release 8, 3GPP TS 36.211 V8.2.0, Mar. 2008, pp. 9-11.
3GPP, Release 10, 3GPP TS 36.213 V10.60, Jun. 2012, pp. 75-78.

(Continued)

*Primary Examiner* — Omar Ghowrwal
(74) *Attorney, Agent, or Firm* — Birch, Stewart, Kolasch & Birch, LLP (57) ABSTRACT

Provided is a method for transmitting an aperiodic sounding reference signal (SRS) in a wireless communication system. A terminal receives an SRS parameter, which indicates the number of antennas for transmitting the aperiodic SRS, by means of a physical downlink control channel (PDCCH), and transmits the aperiodic SRS to the base station using at least one antenna which belongs to the number of antennas for transmitting the aperiodic SRS.

7 Claims, 7 Drawing Sheets

(56) References Cited

U.S. PATENT DOCUMENTS

2012/0113849 A1* 5/2012 Luo et al. ............... 370/252
2012/0113869 A1* 5/2012 Gaal et al. ............... 370/255

FOREIGN PATENT DOCUMENTS

KR  10-2010-0051530 A   5/2010
KR  10-2010-0075642 A   7/2010

OTHER PUBLICATIONS

3GPP, Section 5.5.3, Release 9, 3GPP TS 36.211 V9.1.0, Mar. 2010, pp. 27-30.
3GPP, Section 8.2, Release 9, 3GPP TS 36.213 V9.1.0, Mar. 2010, pp. 57-59.
Ancora et al., "Orthogonal Frequency Division Multiple Access (OFDMA)", LTE—The UMTS Long Term Evolution: From Theory to Practice, 2009, pp. 113-134.
CDM, Uplink Physical Channel Structure, LTE—The UMTS Long Term Evolution, pp. 383-385, 2009.
CDMA2000, pp. 1-3, Aug. 29, 2010.
Code division multple access, pp. 1-6, Nov. 11, 2010.
DCI, 9.3.2.3, Formats for Downlink Control Information, Downlink Physical Data and Control Channels, LTE—The UMTS Long Term Evolution, pp. 194-197, Oct. 3, 2010.
Duplex (telecommunications), 3.1 Time-Divsion Duplexing (TDD), 3.2 Frequency-Division Duplex (FDD), pp. 1-4, Nov. 24, 2010.
Enhanced Data Rates for GSM Evolution, pp. 1-3, Nov. 25, 2010.
E-UTRA, pp. 1-6, Nov. 10, 2010.
Frequency-division multiple access, pp. 1-2, Nov. 24, 2010.
General Packet Radio Service, pp. 1-5, Nov. 25, 2010.
GSM, pp. 1-7, Nov. 20, 2010.
IEEE, IEEE 802.11, 2007, pp. 1-10, Nov. 30, 2010.
IEEE, IEEE 802.16, 2009, pp. 1-3, Nov. 19, 2010.
IEEE, IEEE 802.20, 2008, pp. 1-3, Aug. 22, 2010.
LTE (telecommunication), pp. 1-10, Nov. 30, 2010.
LTE Advanced, pp. 1-3, Nov. 11, 2010.
Phase-shift keying, pp. 1-11, Nov. 12, 2010.
Pseudorandom noise, pp. 1-2, Oct. 23, 2010.
PUCCH formats, Uplink Physical Channel Structure, LTE—The UMTS Long Term Evolution, pp. 385-398, Mar. 30, 2010.
SC-FDMA Principles, Uplink Physical Layer Design, LTE—The UMTS Long Term Evolution, pp. 346-359, Aug. 30, 2010.
Time division multiple access, pp. 1-4, Nov. 22, 2010.
Universal Mobile Telecommunications System, pp. 1-9, Nov. 26, 2010.
Voice over IP, pp. 1-13, Nov. 30, 2010.
Zadoff-Chu Sequences, Synchronization and Cell Search, LTE—The UMTS Long Term Evolution, pp. 145-147, Sep. 18, 2010.

* cited by examiner

METHOD AND APPARATUS FOR TRANSMITTING APERIODIC SOUNDING REFERENCE SIGNAL IN WIRELESS COMMUNICATION SYSTEM

This application is the National Phase of PCT/KR2011/009766 filed on Dec. 19, 2011, which claims priority under 35 U.S.C. 119(e) to U.S. Provisional Application No. 61/424,060 filed on Dec. 17, 2010, all of which are hereby expressly incorporated by reference into the present application.

BACKGROUND OF THE INVENTION

1. Field of the Invention

The present invention relates to wireless communications, and more particularly, to a method and apparatus for transmitting an aperiodic sounding reference signal in a wireless communication system.

2. Related Art

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a reference signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value $\hat{h}$ using Equation 1 in the case in which a Least Square (LS) method is used.

$$\hat{h} = y/p = h + n/p = h + \hat{n} \qquad <\text{Equation 1}>$$

The accuracy of the channel estimation value $\hat{h}$ estimated using the reference signal p is determined by the value $\hat{n}$. To accurately estimate the value h, the value $\hat{n}$ must converge on 0. To this end, the influence of the value $\hat{n}$ has to be minimized by estimating a channel using a large number of reference signals. A variety of algorithms for a better channel estimation performance may exist.

An uplink reference signal can be classified into a demodulation reference signal (DMRS) and a sounding reference signal (SRS). The DMRS is a reference signal used for channel estimation to demodulate a received signal. The DMRS can be associated with PUSCH or PUCCH transmission. The SRS is a reference signal transmitted for uplink scheduling by a user equipment to a base station. The base station estimates an uplink channel by using the received SRS, and the estimated uplink channel is used in uplink scheduling. Transmission of the SRS may be referred to the section 5.5.3 of 3GPP TS 36.211 V9.1.0 (2010-03), and an operation of a user equipment in an SRS transmission process may be referred to the section 8.2 of 3GPP TS 36.213 V9.1.0 (2010-03).

A SRS may be transmitted periodically or may be transmitted aperiodically by being triggered by a base station when the base station needs to transmit the SRS. In LTE-A, a plurality of antennas may be configured with respect to physical uplink shared channel (PUSCH) transmission of a user equipment. As a result, a method for efficiently transmitting an aperiodic SRS through the plurality of antennas is required.

SUMMARY OF THE INVENTION

The present invention provides a method and apparatus for transmitting an aperiodic sounding reference signal (SRS) in a wireless communication system.

In an aspect, a method for transmitting, by a user equipment (UE), an aperiodic sounding reference signal (SRS) in a wireless communication system is provided. The method includes receiving an SRS parameter indicating the number of antennas for transmitting the aperiodic SRS from a base station through a physical downlink control channel (PDCCH), and transmitting the aperiodic SRS to the base station through at least one antenna corresponding to the number of the antennas for transmitting the aperiodic SRS.

The SRS parameter may be received by being included in a downlink control information (DCI) format 4.

The number of antennas for transmitting the aperiodic SRS may be determined according to a transmission mode of a physical uplink shared channel (PUSCH).

The number of antennas for transmitting the aperiodic SRS may be one of 1, 2 and 4 when the transmission mode of the PUSCH is a single-antenna transmission mode.

The number of antennas for transmitting the aperiodic SRS may be one of 1 and 2 when the transmission mode of the PUSCH is a multi-antenna transmission mode and the number of antennas configured to transmit the PUSCH is 2.

The number of antennas for transmitting the aperiodic SRS may be one of 1 and 4 when the transmission mode of the PUSCH is the multi-antenna transmission mode and the number of antennas configured to transmit the PUSCH is 4.

The method may further include receiving a parameter indicating an initial value of a cyclic shift of the antenna for transmitting the aperiodic SRS from the base station through the PDCCH.

The parameter indicating the initial value of the cyclic shift of the antenna for transmitting the aperiodic SRS may be configured by 3 bits.

The method may further include receiving a parameter indicating an interval of cyclic shifts of each antenna for transmitting the aperiodic SRS from the base station through the PDCCH.

The interval of cyclic shifts of each antenna for transmitting the aperiodic SRS, au be determined to be maximum depending on the number of antennas for transmitting the aperiodic SRS.

The interval of cyclic shifts of each antenna for transmitting the aperiodic SRS may be one of 2 and 4.

In another aspect, a user equipment in a wireless communication system is provided. The user equipment includes a radio frequency (RF) unit transmitting or receiving a radio signal, and a processor coupled to the RF unit, and configured for receiving an SRS parameter indicating the number of antennas for transmitting the aperiodic SRS from a base station through a physical downlink control channel (PDCCH), and transmitting the aperiodic SRS to the base station through at least one antenna corresponding to the number of the antennas for transmitting the aperiodic SRS.

The aperiodic SRS can be efficiently transmitted through at least one antenna which is dynamically set.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as IEEE (Institute of Electrical and Electronics Engineers) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP ($3^{rd}$ generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
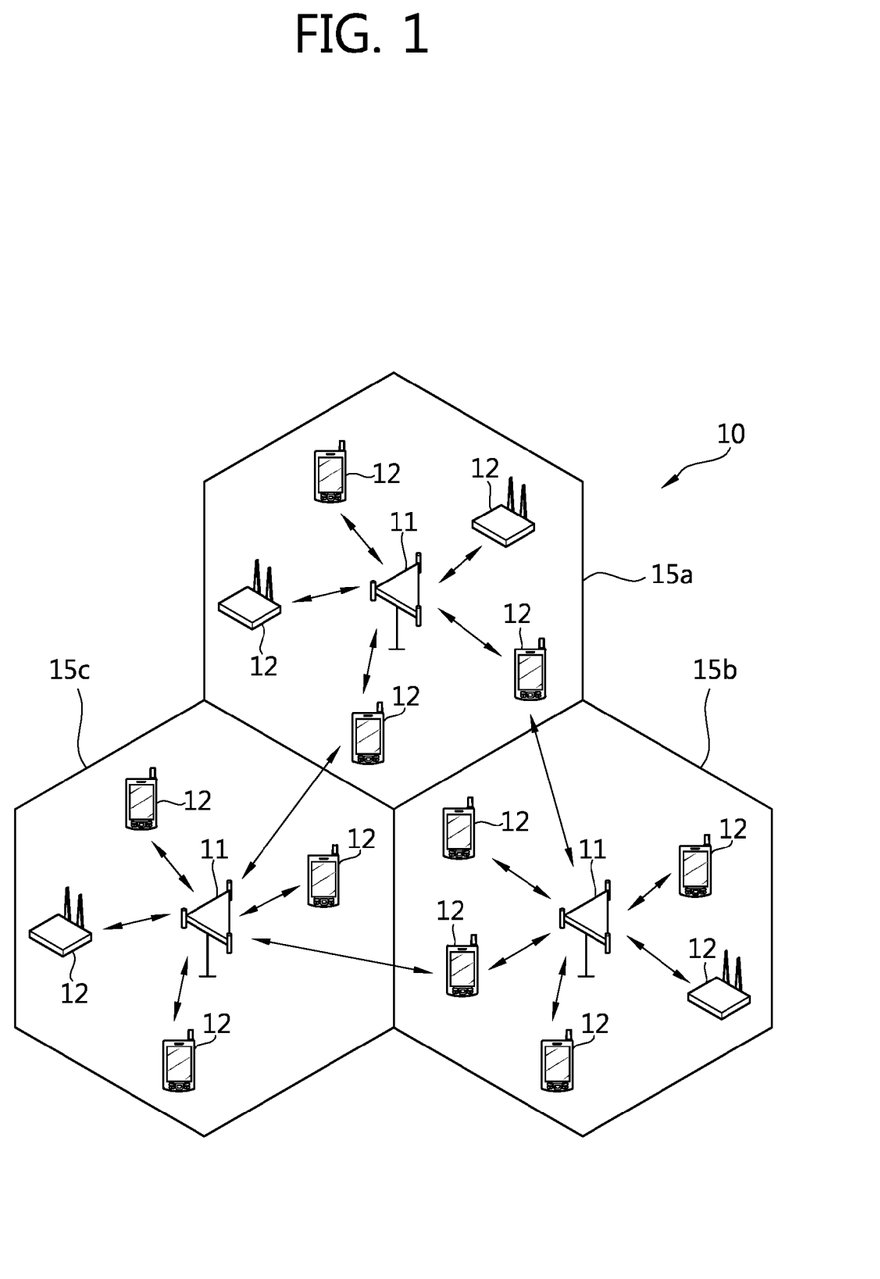
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as eNB (evolved-NodeB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
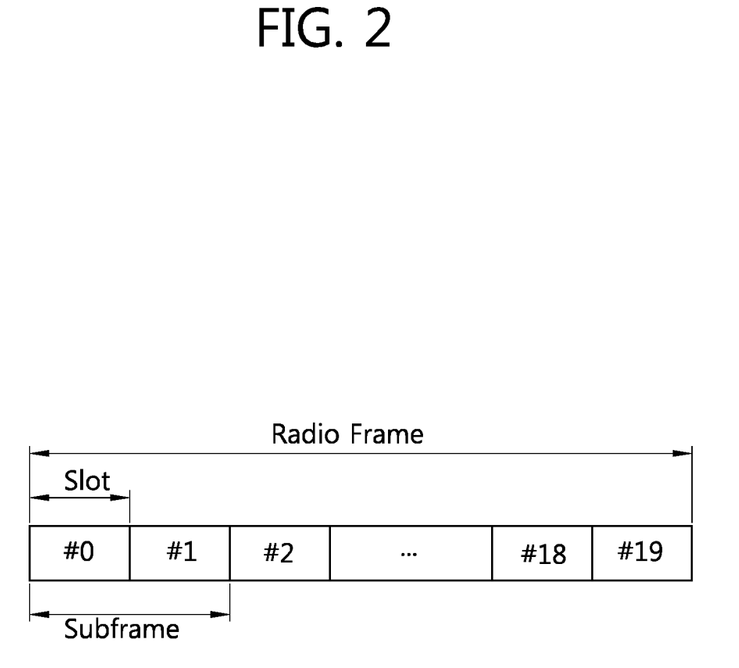
FIG. 2 shows the structure of a radio frame in 3GPP LTE.

FIG. 2 shows the structure of a radio frame in 3GPP LTE. It may be referred to Paragraph 4.2 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03).

Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
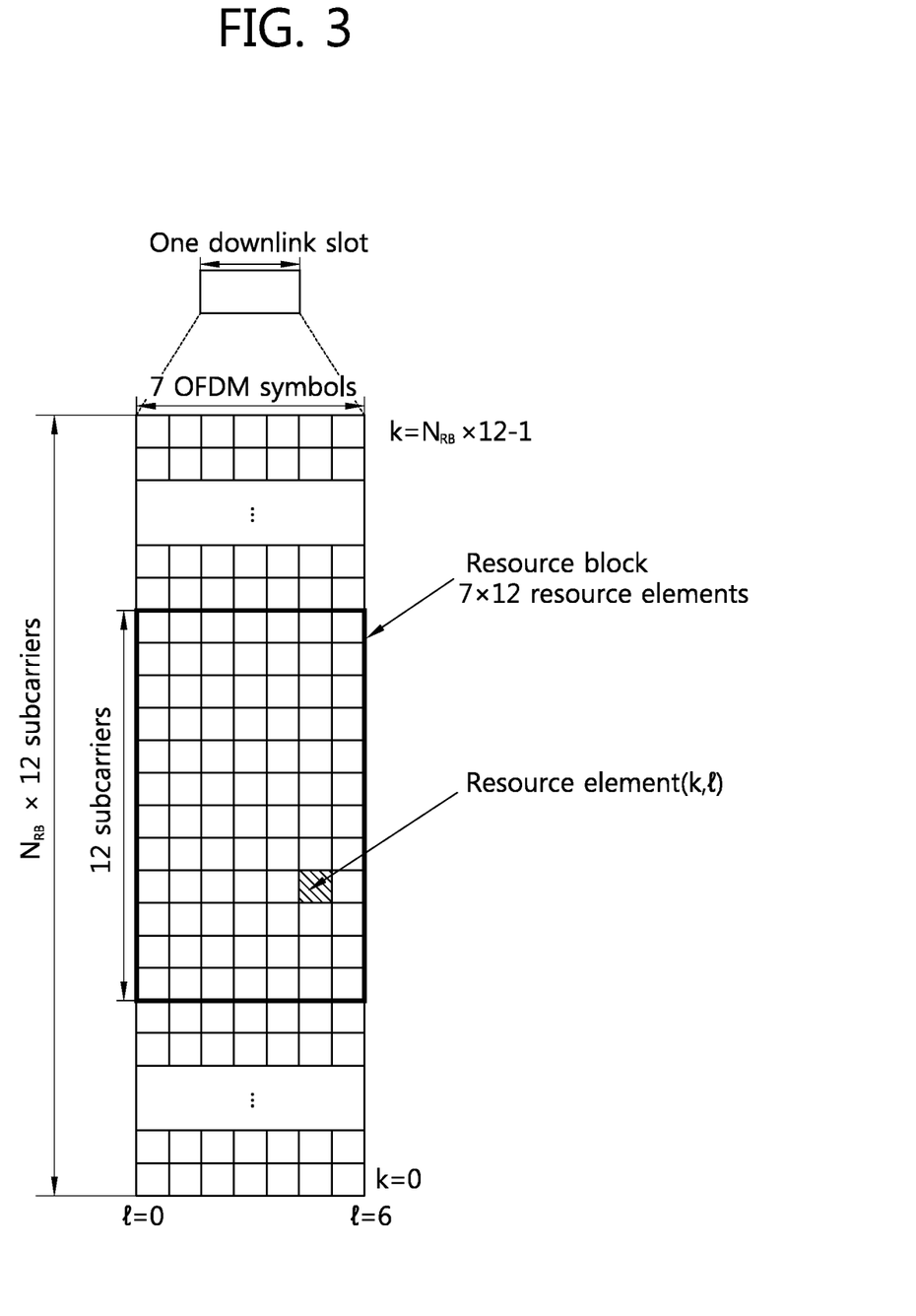
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, ..., $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
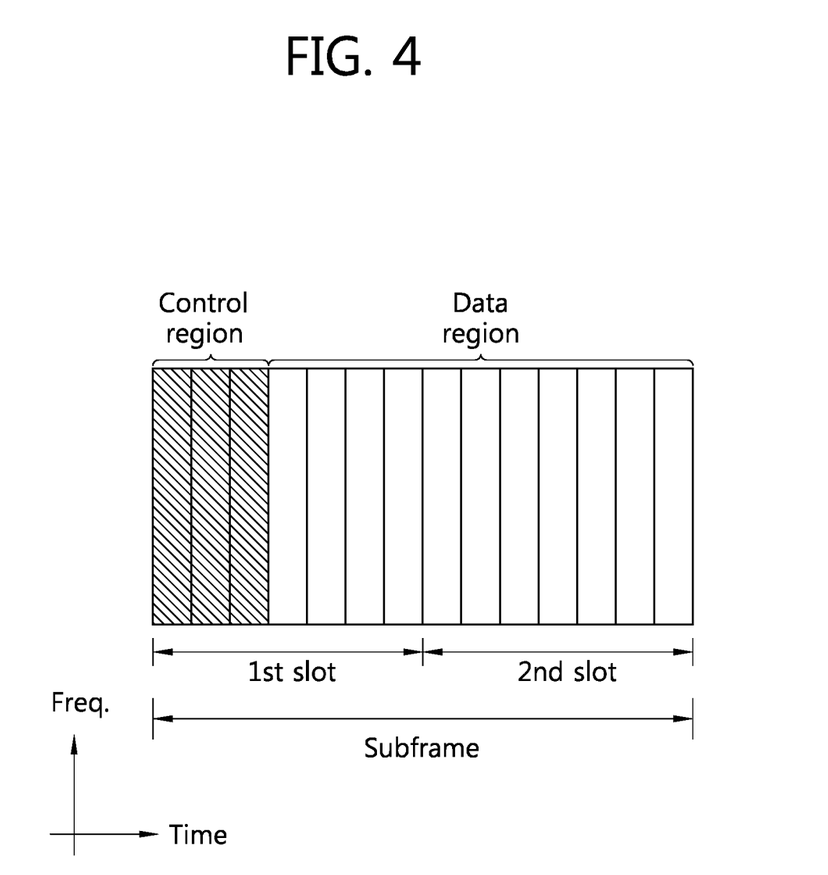
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 Mhz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of a higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCD corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC. The DCI to which the CRC is attached may be transmitted by using channel coding and rate matching.

For example, a DCI format 0 may include the following fields. The DCI format 0 may be used for scheduling of a physical uplink shared channel (PUSCH).

Flag field for DCI format 0/1A identification: It may indicate DCI format 0 if a flag value is 0, and may indicate DCI format A if the flag value is 1.
Frequency hopping flag field: 1 bit
Resource block assignment and hopping resource allocation field
Modulation and coding scheme and redundancy version field: 5 bits
New data indicator field: 1 bit
TPC command field for scheduled PUSCH: 2 bits
Cyclic shift field for DMRS: 3 bits
UL index field: 2 bits
Downlink assignment index (DAI) field: 2 bits
CQI request field: 1 bit Each of the fields may be mapped in the order in which it appears in the description above. That is, the flag field for DCI format 0/1A identification may be mapped to a first part of information bits, and the remaining fields may be mapped in sequence. The DCI format 1A may be used for scheduling of one PDSCH codeword. In addition, a most significant bit (MSB) of each field may be mapped to the first part of information bits. Meanwhile, if a size of the DCI format 0 is less than a size of the DCI format 1A, a zero bit may be padded until the size of the DCI format 0 becomes equal to the size of the DCI format 1A.

A DCI format 4 may be used for scheduling of a PUSCH for multi-antenna ports transmission mode.

Figure 5:
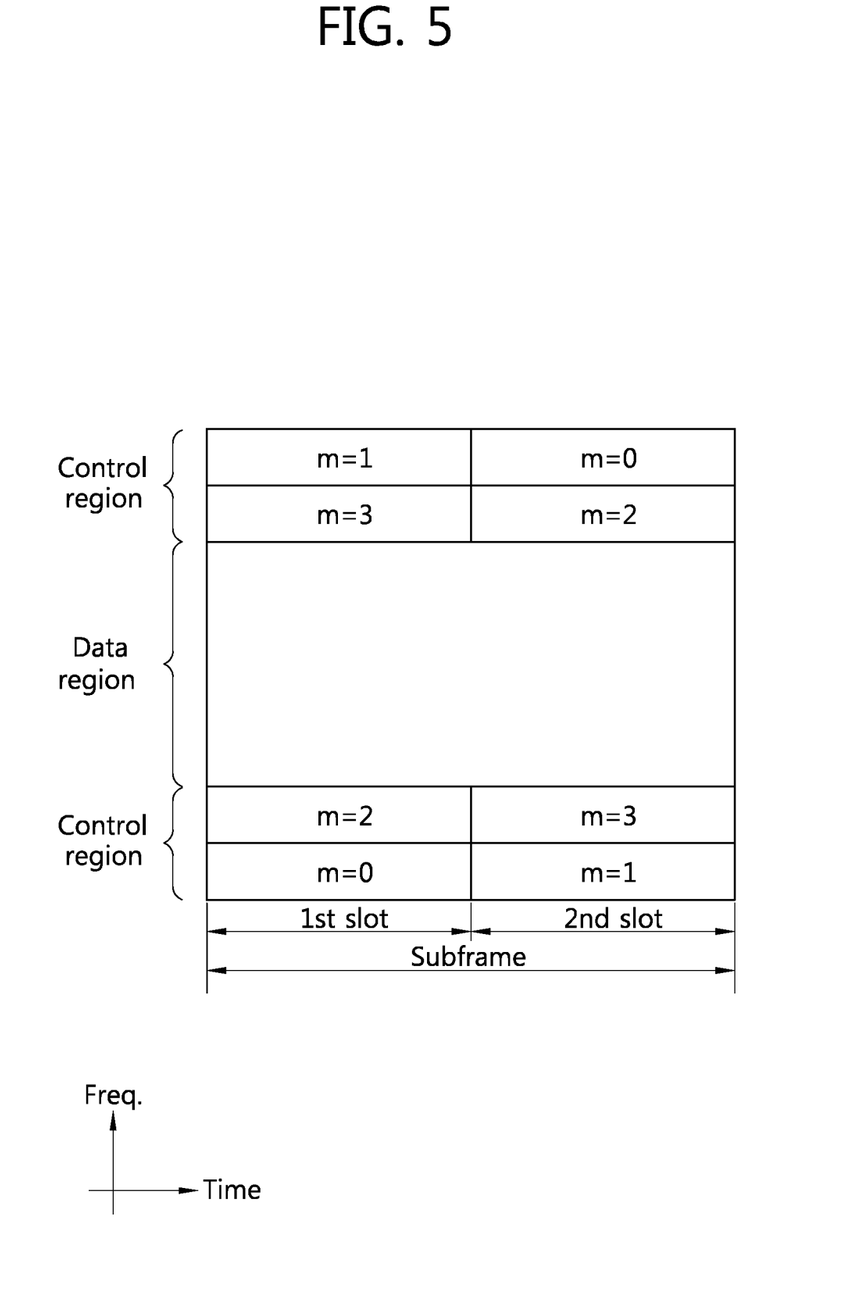
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH with respect to a UE is allocated by a pair of resource blocks in a subframe. The resource blocks belonging to the pair of resource blocks (RBs) occupy different subcarriers in first and second slots, respectively. The frequency occupied by the RBs belonging to the pair of RBs is changed based on a slot boundary. This is said that the pair of RBs allocated to the PUCCH are frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, an scheduling request (SR), and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Hereinafter, an uplink reference signal (RS) will be described.

In general, an RS is transmitted as a sequence. Any sequence can be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Example of the PN sequence include an m-sequence, a computer generated sequence, a Gold sequence, a Kasami sequence, etc. In addition, the RS sequence may be a cyclically shifted sequence.

The uplink RS can be classified into a demodulation reference signal (DMRS) and a sounding reference signal (SRS). The DMRS is an RS used for channel estimation to demodulate a received signal. The DMRS can be associated with PUSCH or PUCCH transmission. The SRS is an RS transmitted for uplink scheduling by a UE to a BS. The BS estimates an uplink channel by using the received SRS, and the estimated uplink channel is used in uplink scheduling. The SRS is not associated with PUSCH or PUCCH transmission. The same type of base sequences can be used for the DMRS and the SRS. Meanwhile, precoding applied to the DMRS in uplink multi-antenna transmission may be the same as precoding applied to the PUSCH. Cyclic shift separation is a primary scheme for multiplexing the DMRS. In an LTE-A system, the SRS may not be precoded, and may be an antenna-specific RS.

The SRS is an RS transmitted by a relay station to the BS and is an RS which is not related to uplink data or control signal transmission. In general, the SRS may be used for channel quality estimation for frequency selective scheduling in uplink or may be used for other usages. For example, the SRS may be used in power control, initial MCS selection, initial power control for data transmission, etc. In general, the SRS is transmitted in a last SC-FDMA symbol of one subframe.

A reference signal sequence $r_{u,v}^{(\alpha)}(n)$ may be defined based on a base sequence $b_{u,v}(n)$ and a cyclic shift $\alpha$ according to Equation 2.

$$r_{u,v}^{(\alpha)}(n) = e^{j\alpha n} b_{u,v}(n), \quad 0 \leq n < M_{sc}^{RS} \qquad \text{[Equation 2]}$$

In Equation 2, $M_{sc}^{RS}(1 \leq m \leq N_{RB}^{max,UL})$ is the length of the reference signal sequence and $M_{sc}^{RS} = m \cdot N_{sc}^{RB}$. $N_{sc}^{RB}$ is the size of a resource block indicated by the number of subcarriers in the frequency domain. $N_{RB}^{max,UL}$ indicates a maximum value of a UL bandwidth indicated by a multiple of $N_{sc}^{RB}$. A plurality of reference signal sequences may be defined by differently applying a cyclic shift value $\alpha$ from one base sequence.

A base sequence $b_{u,v}(n)$ is divided into a plurality of groups. Here, u∈{0, 1, ..., 29} indicates a group index, and v indicates a base sequence index within the group. The base sequence depends on the length $M_{sc}^{RS}$ of the base sequence. Each group includes a base sequence (v=0) having a length of $M_{sc}^{RS}$ for m (1≤m≤5) and includes 2 base sequences (v=0, 1) having a length of $M_{sc}^{RS}$ for m (6≤m≤$n_{RB}^{max,UL}$). The sequence group index u and the base sequence index v within a group may vary according to time as in group hopping or sequence hopping.

In the SRS sequence, u is a PUCCH sequence group index, and v is a base sequence index. The cyclic shift value $\alpha$ is defined by Equation 3 shown below:

$$\alpha = 2\pi \frac{n_{SRS}^{cs}}{8} \qquad \text{[Equation 3]}$$

In Equation 3, $n_{SRS}^{cs}$ is a value configured by a higher layer with respect to each UE, which may be any one of integers 0 to 7.

In order to satisfy the transmission power $P_{SRS}$, the SRS sequence is multiplied by an amplitude scaling factor $\beta_{SRS}$ and then mapped to a resource element. The SRS sequence may be mapped, starting from $r_{SRS}(0)$, to a resource element (k,l) according to Equation 4 shown below:

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \qquad \text{[Equation 4]}$$

In Equation 4, $k_0$ is a starting position in the frequency domain of the SRS, and $M_{sc,b}^{RS}$ is the length of the SRS sequence defined by Equation 5 shown below:

$$M_{sc,b}^{RS} = m_{SRS,b} N_{sc}^{RB}/2 \qquad \text{[Equation 5]}$$

In Equation 5, $m_{SRS,b}$ can be given by Table 1 to Table 4 (to be described) with respect to each uplink bandwidth $N_{RB}^{UL}$.

In Equation 4, $k_0$ can be defined by Equation 6 shown below:

$$k_0 = k_0' + \sum_{b=0}^{B_{SRS}} 2M_{sc,b}^{RS} n_b \quad \text{[Equation 6]}$$

In Equation 6, $k_0'$ is given as $k_0'=(\lfloor N_{RB}^{UL}/2 \rfloor - m_{SRS,0}/2) N_{SC}^{RB} + k_{TC}$ in a normal uplink subframe. $k_{TC} \in \{0, 1\}$ is a parameter given to the UE by a higher layer, and $n_b$ is a frequency position index.

Frequency hopping of the SRS is configured by $b_{hop} \in \{0, 1, 2, 3\}$. When frequency hopping of the SRS is not available ($b_{hop} \geq B_{SRS}$), the frequency position index $n_b$ is determined by the constant of $n_b = \lfloor 4n_{RRC}/m_{SRS,b} \rfloor \bmod N_b$, and $n_{RRC}$ is given by the higher layer. When frequency hopping of the SRS is available ($b_{hop} < B_{SRS}$), the frequency position index $n_b$ may be determined by Equation 7 shown below:

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{[Equation 7]}$$

In Equation 7, $n_b$ is determined by Table 1 to Table 4 (to be described), and $F_b(n_{SRS})$ may be determined by Equation 8 shown below:

$$F_b(n_{SRS}) = \begin{cases} (N_b/2) \left\lfloor \frac{n_{SRS} \bmod \Pi_{b'=b_{hop}}^{b} N_{b'}}{\Pi_{b'=b_{hop}}^{b-1} N_{b'}} \right\rfloor & \text{if } N_b \text{ even} \\ \left\lfloor \frac{n_{SRS} \bmod \Pi_{b'=b_{hop}}^{b} N_{b'}}{2\Pi_{b'=b_{hop}}^{b-1} N_{b'}} \right\rfloor & \\ \lfloor N_b/2 \rfloor \lfloor n_{SRS}/\Pi_{b'=b_{hop}}^{b-1} N_{b'} \rfloor & \text{if } N_b \text{ odd} \end{cases} \quad \text{[Equation 8]}$$

In Equation 8, $n_{SRS}$ indicates the number of UE-specific SRS transmissions, which may be determined by Equation 9 shown below:

$$n_{SRS} = \begin{cases} 2N_{SP}n_f + 2(N_{SP} - 1)\lfloor \frac{n_s}{10} \rfloor + \lfloor \frac{T_{offset}}{T_{offset\_max}} \rfloor, & \text{for 2 ms SRS periodicity of frame structure 2} \\ \lfloor (n_f \times 10 + \lfloor n_s/2 \rfloor)/T_{SRS} \rfloor, & \text{otherwise} \end{cases} \quad \text{[Equation 9]}$$

In Equation 9, $T_{SRS}$ is UE-specific periodicity, $T_{offset}$ is an SRS subframe offset, and $T_{offset\_max}$ is a maximum value of $T_{offset}$ for a particular configuration of an SRS subframe offset. $T_{SRS}$ and $T_{offset}$ can be given by Table 7 and Table 8 shown below.

Table 1 to Table 4 show an example of SRS bandwidth configurations. A 3-bit cell-specific parameter may be broadcast in order to indicate a configuration of one of eight bandwidths. Also, a 2-bit UE-specific parameter may be given by a higher layer in order to indicate a configuration of one of four bandwidths.

Table 1 shows an example of $m_{SRS,b}$ and $N_b$ (b=0, 1, 2, 3) when an uplink bandwidth $N_{RB}^{UL}$ is within the range of $6 \leq N_{RB}^{UL} \leq 40$.

TABLE 1

| SRS bandwidth configuration $C_{SRS}$ | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

Table 2 shows an example of $m_{SRS,b}$ and $N_b$ (b=0, 1, 2, 3) when an uplink bandwidth $N_{RB}^{UL}$ is within the range of $40 \leq N_{RB}^{UL} \leq 60$.

TABLE 2

| SRS bandwidth configuration $C_{SRS}$ | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

Table 3 shows an example of $M_{SRS,b}$ and $N_b$ (b=0, 1, 2, 3) when an uplink bandwidth $N_{RB}^{UL}$ is within the range of $60 \leq N_{RB}^{UL} \leq 80$.

TABLE 3

| SRS bandwidth configuration $C_{SRS}$ | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

Table 4 shows an example of $M_{SRS,b}$ and $N_b$ (b=0, 1, 2, 3) when an uplink bandwidth $N_{RB}^{UL}$ is within the range of $80 \leq N_{RB}^{UL} \leq 110$.

TABLE 4

| SRS bandwidth configuration $C_{SRS}$ | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |

TABLE 4-continued

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

In Table 1 to Table 4, $C_{SRS} \in \{0, 1, 2, 3, 4, 5, 6, 7\}$, a cell-specific parameter, and $B_{SRS} \in \{0, 1, 2, 3\}$, a UE-specific parameter, are given by a higher layer.

Table 5 and 6 show examples of a cell-specific subframe configuration period parameter $T_{SFC}$ and a cell-specific subframe offset parameter $\Delta_{SFC}$ with respect to SRS transmission.

Table 5 shows an example of an SRS subframe configuration in the FDD system. According to Table 5, the SRS subframe configuration can be indicated by a parameter having a 4-bit length and the period of the SRS subframe may be any one of 1, 2, 5, and 10 subframes.

TABLE 5

| srsSubframeConfiguration | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

Table 6 shows an example of an SRS subframe configuration in the TDD system.

TABLE 6

| srsSubframeConfiguration | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

The operation by the UE for an SRS transmission is as follows.

When the UE transmits an SRS, transmission power $P_{SRS}$ in a subframe i can be determined by Equation 10 shown below.

$$P_{SRS}(i) = \min\{P_{CMAX}, P_{SRS\_OFFSET} + 10\log_{10}(M_{SRS}) + P_{O\_PUSCH}(j) + \alpha(j) \cdot PL + f(i)\}$$ [Equation 10]

In Equation 10, $P_{CMAX}$ is pre-determined transmission power of the UE. $P_{SRS\_OFFSET}$ is a UE-specific parameter having a 4-bit length semi-statically determined by a higher layer. When Ks=1.25, $P_{SRS\_OFFSET}$ may be determined in units of 1 dB within the range of [−3, 12] dB. When Ks=0, $P_{SRS\_OFFSET}$ may be determined in units of 1.5 dB within the range of [−10.5, 12] dB. $M_{SRS}$ is a bandwidth of an SRS transmission indicated by the number of resource blocks, and $P_{O\_PUSCH}(j)$ is a parameter configured by the sum of $P_{O\_NOMINAL\_PUSCH}(j)$, a cell-specific nominal component given by a higher layer, and $P_{O\_UE\_PUSCH}(j)$, a UE-specific component also given by the higher layer. $\alpha(j)$ is a 3-bit cell-specific parameter given by the higher layer, PL is an estimated value of pathloss calculated by the UE, and f(i) indicates a current power control adjustment state with respect to the PUSCH.

In case in which the UE can select a transmission antenna, an index of a UE antenna $a(n_{SRS})$ for transmitting SRS during an $n_{SRS}$ time is given as $a(n_{SRS})=n_{SRS}$ mod 2 with respect to the entire sounding bandwidth or a partial sounding bandwidth when frequency hopping is not available, and it may be given by Equation 11 shown below when frequency hopping is available.

$$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases}$$ [Equation 11]

In Equation 11, $B_{SRS}$ is an SRS bandwidth and $b_{hop}$ is a frequency hopping bandwidth, $N_b$ may be determined by a predetermined table according to $C_{SRS}$ and $B_{SRS}$, and $$K = \prod_{b'=b_{hop}}^{B_{SRS}} N_{b'}.$$

In Equation 11, $\beta$ can be determined by Equation 12 shown below:

$$\beta = \begin{cases} 1 & \text{where } K \bmod 4 = 0 \\ 0 & \text{otherwise} \end{cases}$$ [Equation 12]

In the TDD system, when a single SC-FDMA symbol exists in a uplink pilot time slot (UpPTS), the corresponding SC-FDMA symbol can be used for the SRS transmission. When two SC-FDMA symbols exist in the UpPTS, the corresponding two SC-FDMA symbols can be all used for the SRS transmission and can be simultaneously allocated to a single UE.

When the SRS transmission and the transmission of the PUCCH format 2/2a/2b concurrently occur in the same subframe, the UE does not transmit the SRS anytime.

In case in which the ackNackSRS-SimultaneousTransmission parameter is false, when the SRS transmission and the transmission of the PUCCH carrying the ACK/NACK and/or the positive SR are preformed in the same subframe, the UE do not always transmit the SRS. Also, In case in which the ackNackSRS-SimultaneousTransmission parameter is true, when the SRS transmission and the transmission of the PUCCH carrying the ACK/NACK and/or the positive SR are configured in the same subframe, the UE uses a shortened PUCCH format and simultaneously transmits the PUCCH carrying the ACK/NACK and/or positive SR and the SRS. Namely, when the PUCCH carrying the ACK/NACK and/or positive SR is configured in the SRS subframe which is set to be cell-specific, the UE uses the shortened PUCCH format and simultaneously transmits the PUCCH carrying the ACK/NACK and/or positive SR and the SRS. When the SRS transmission overlaps with a physical random access channel (PRACH) for a preamble format 4 or when it exceeds the range of the uplink system bandwidth configured in the cell, the UE does not transmit the SRS.

The parameter, ackNackSRS-SimultaneousTransmission, given by the higher layer determines whether or not the UE supports simultaneous transmission of the PUCCH carrying the ACK/NACK and the SRS in a single subframe. When the UE is configured to simultaneously transmit the PUCCH carrying the ACK/NACK and the SRS in a single subframe, the UE can transmit the ACK/NACK and the SRS in a cell-specific SRS subframe. At this time, the shortened PUCCH format may be used, and a transmission of an SR or ACK/NACK corresponding to a position at which the SRS is transmitted is omitted (or punctured). When shortened PUCCH format is used in the cell-specific SRS subframe even when the SRS is not transmitted in the corresponding subframe. When the UE is configured not to simultaneously transmit the PUCCH carrying the ACK/NACK and the SRS in a single subframe, the UE may use a general PUCCH format 1/1a/1b in order to transmit the ACK/NACK and SR.

Table 7 and Table 8 show an example of a UE-specific SRS configuration indicating an SRS transmission period $T_{SRS}$ and a subframe offset $T_{offset}$. The SRS transmission period $T_{SRS}$ may be determined to be any one of {2, 5, 10, 20, 40, 80, 160, 320} ms.

Table 7 shows an example of an SRS configuration in the FDD system.

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$ - 2 |
| 7-16 | 10 | $I_{SRS}$ - 7 |
| 17-36 | 20 | $I_{SRS}$ - 17 |
| 37-76 | 40 | $I_{SRS}$ - 37 |
| 77-156 | 80 | $I_{SRS}$ - 77 |
| 157-316 | 160 | $I_{SRS}$ - 157 |
| 317-636 | 320 | $I_{SRS}$ - 317 |
| 637-1023 | reserved | reserved |

Table 8 shows an example of an SRS configuration in the TDD system.

TABLE 8

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ - 10 |
| 15-24 | 10 | $I_{SRS}$ - 15 |
| 25-44 | 20 | $I_{SRS}$ - 25 |
| 45-84 | 40 | $I_{SRS}$ - 45 |
| 85-164 | 80 | $I_{SRS}$ - 85 |
| 165-324 | 160 | $I_{SRS}$ - 165 |
| 325-644 | 320 | $I_{SRS}$ - 325 |
| 645-1023 | reserved | reserved |

In case in which $T_{SRS}$>2 in the TDD system and in case of the FDD system, the SRS subframe satisfies $(10*n_f+k_{SRS}-T_{offset})$ mod $T_{SRS}$=0. $n_f$ indicates a frame index, and $k_{SRS}$ is a subframe index in a frame in the FDD system. In the TDD system, when $T_{SRS}$=2, two SRS resources can be configured in a half frame including at least one uplink subframe and the SRS subframe satisfies $(k_{SRS}-T_{offset})$mod 5=0.

In the TDD system, $k_{SRS}$ may be determined as shown in Table 9 below.

TABLE 9

| | subframe index n | | | | | | | | | |
|---|---|---|---|---|---|---|---|---|---|---|
| | | 1 | | | | | 6 | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 0 | 1 | 2 | 3 | 4 | | 5 | 6 | 7 | 8 | 9 |
| $k_{SRS}$ in case UpPTS length of 1 symbol | | 1 | | 2 | 3 | 4 | | 6 | | 7 | 8 | 9 |

Meanwhile, when the SRS transmission and a transmission of the PUSCH corresponding to a re-transmission of the same transport block as part of a random access response grant or a contention-based access procedure is performed in the same subframe, the UE does not transmit the SRS anytime.

A SRS transmission method can be classified into two. There are a periodic SRS transmission method that periodically transmits an SRS according to an SRS parameter received by radio resource control (RRC) signaling as defined in LTE rel-8, and an aperiodic SRS transmission method that transmits an SRS whenever necessarily on the basis of a message dynamically triggered from a BS. The aperiodic SRS transmission method can be used in LTE-A.

In the periodic SRS transmission method and the aperiodic SRS transmission method, an SRS can be transmitted in a UE-specific SRS subframe determined in a UE-specific manner. In a periodic SRS transmission method defined in LTE rel-8, a cell-specific SRS subframe is configured periodically by a cell-specific SRS parameter, and periodic SRS transmission is performed in a periodic UE-specific SRS subframe configured by a UE-specific SRS parameter among cell-specific SRS subframes. In this case, the periodic UE-specific SRS subframe may be a subset of the cell-specific subframe. The cell-specific SRS parameter can be given by a higher layer. In the aperiodic SRS transmission method, an aperiodic SRS can be transmitted in an aperiodic UE-specific SRS subframe determined by a UE-specific aperiodic SRS parameter. The aperiodic UE-specific SRS subframe of the aperiodic SRS transmission method may be a subset of the cell-specific SRS subframe as defined in the LTE rel-8. Alternatively, the aperiodic UE-specific SRS subframe may be the same as the cell-specific subframe. The UE-specific aperiodic SRS parameter may also be given by a higher layer similarly to the cell-specific SRS parameter. The UE-specific aperiodic SRS subframe can be configured by the aforementioned subframe periodicity and subframe offset of Table 7 or Table 8.

A BS may transmit a triggering signal to a UE in order to trigger transmission of an aperiodic SRS of the UE. A signal to trigger of the transmission of the aperiodic SRS of the UE may be transmitted through a bit newly defined in a DCI format 0 or 1A. The size of the aperiodic SRS triggering bit within the DCI format 0 or 1A may be 1 bit. When the aperiodic SRS triggering bit is 1 bit, any one of two statuses which may be indicated by the aperiodic SRS triggering bit is set to trigger the transmission of the aperiodic SRS and the other one may be set not to trigger the transmission of the aperiodic SRS. Further, the aperiodic SRS triggering signal newly defined within the DCI format 0 or 1A may be activated by an aperiodic SRS activation signal. That is, the aperiodic SRS activation signal may be used to indicate whether the aperiodic SRS is triggered by the aperiodic SRS triggering bit within the DCI format 0 or 1A. The aperiodic SRS activation signal may be subjected to RRC signaling. The size of the aperiodic SRS activation signal may be 1 bit. That is, when a value of the aperiodic SRS activation signal is 1, the aperiodic SRS triggering bit indicating the triggering of the aperiodic SRS may be defined.

Hereinafter, a method for transmitting an aperiodic SRS according to embodiments of the present invention will be described.

Various SRS parameters may be defined for an aperiodic SRS in addition to an aperiodic SRS triggering signal and an aperiodic SRS activation signal. In particular, in LTE-A, a multi-antenna transmission mode of a UE is supported and the multi-antenna transmission mode may be scheduled by a DCI format 4 transmitted through a PDCCH. The aperiodic SRS may also be transmitted through a plurality of antennas, and as a result, the number of antennas for transmitting the aperiodic SRS also needs to be dynamically indicated through the PDCCH. In the following description, the antenna for transmitting the SRS may be a physical antenna or a virtual antenna. Further, the antenna may be substituted by an antenna port or a layer.

Figure 6:
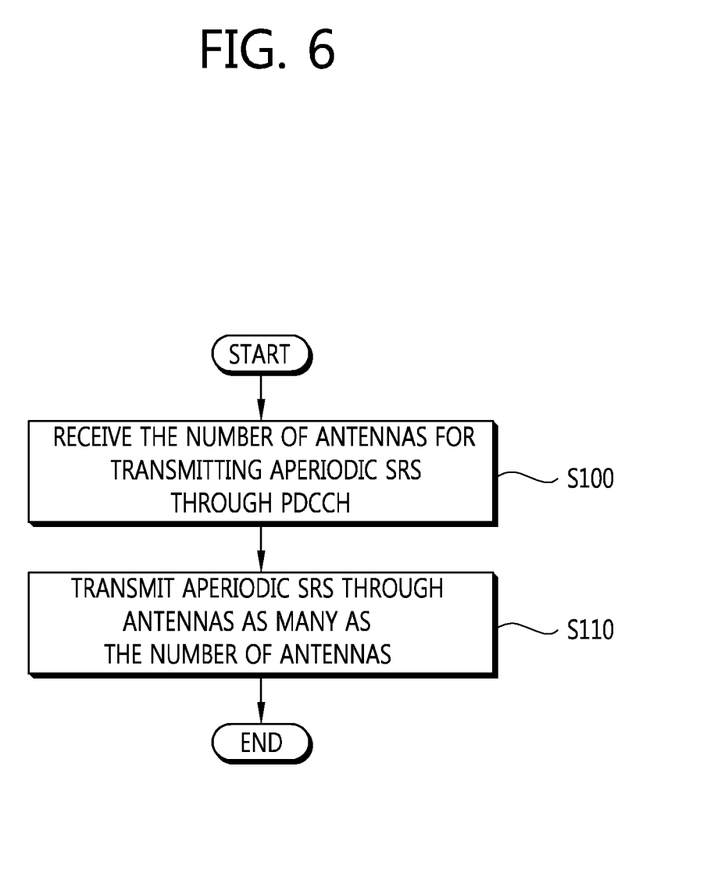
FIG. 6 shows an example of a method for transmitting an aperiodic SRS according to an embodiment of the present invention.

FIG. 6 shows an example of a method for transmitting an aperiodic SRS according to an embodiment of the present invention.

In step S100, a UE receives from a base station an SRS parameter indicating the number of antennas for transmitting an aperiodic SRS through a PDCCH. In step S110, the UE transmits the aperiodic SRS to the base station through at least one antenna corresponding to the number of the antennas for transmitting the aperiodic SRS.

The number of antennas for transmitting the aperiodic SRS may be dynamically determined through the DCI format 4. The number of antennas for transmitting the aperiodic SRS may be determined according to a PUSCH transmission mode. The PUSCH transmission mode may be indicated by higher layer signaling. Alternatively, the number of antennas for transmitting the aperiodic SRS may be determined according to the number of transmission antennas of the UE or the number of transmission antennas configured to be transmittable.

The PUSCH transmission mode may be classified into two types.

1) PUSCH transmission mode 1: indicates a single antenna port mode.

PUSCH transmission mode 1 may include two different configurations. A first configuration supports a single-antenna PUSCH transmission scheme of LTE rel-8. A second configuration supports a single-antenna PUSCH transmission scheme of LTE-A that supports continuous or non-continuous resource allocation, orthogonal cover code (OCC)/cyclic shift (CS) mapping, triggering of dynamic aperiodic SRS transmission, and the like.

2) PUSCH transmission mode 2: indicates a multi-antenna port mode.

PUSCH transmission mode 2 may also include two different configurations when the DCI format 4 is used. A first configuration as a configuration that transmits the PUSCH by using two antennas or layers includes two antenna ports (0,1) for the PUSCH. That is, in this case, the PUSCH uses a 2tx codebook. A second configuration as a configuration that transmits the PUSCH by using four antennas or layers includes antenna ports (0, 1, 2, 3) for the PUSCH. In this case, the PUSCH uses a 4tx codebook. When the DCI format 0 is received instead of the DCI format 4, a single antenna port is used.

A configuration of the aperiodic SRS transmission antenna depending on the PUSCH transmission mode according to an embodiment of the present invention will be described below.

1) In case of PUSCH transmission mode 1: the number of antennas for transmitting the aperiodic SRS is any one of 0, 1, 2, and 4. The case in which the number of antennas is 0 means that the aperiodic SRS is not transmitted.

2) In case of PUSCH transmission mode 2 including two antennas: it is case that a UE having two transmission antennas performs PUSCH transmission through two antennas, layers, or antenna ports or a UE having four transmission antennas may perform PUSCH transmission through two transmission antennas, layers, or antenna ports. In this case, the number of antennas for transmitting the aperiodic SRS is any one of 0, 1, and 2.

3) In case of PUSCH transmission mode 2 including four antenna ports: it is case that a UE having four transmission antennas performs PUSCH transmission through four antennas, layers or antenna ports. The number of antennas for transmitting the aperiodic SRS is any one of 0, 1, and 4.

That is, in case of PUSCH transmission mode 2, the maximum number of antennas for transmitting the aperiodic SRS may be changed depending on the number of antennas configured for PUSCH transmission. As a result, when the number of antennas configured for PUSCH transmission is determined, ambiguity for the number of antennas for transmitting the aperiodic SRS may be removed.

Meanwhile, when the aperiodic SRS is transmitted through the plurality of antennas, an additional SRS parameter therefor needs to be defined.

First, an initial value of a cyclic shift may be additionally defined in order to indicate the cyclic shift used when the aperiodic SRS is transmitted through the plurality of antennas. The initial value of the cyclic shift may be 3 bits. In the existing LTE rel-8, a cyclic shift used to transmit a periodic SRS is indicated as a radio resource control (RRC) parameter of 3 bits. However, as presented by an embodiment of the present invention, when the number of antennas for transmitting the aperiodic SRS is set to be dynamically changed, methods of dynamically allocating the cyclic shift by considering multiplexing of the corresponding antennas or multiplexing among different UEs may be considered. The initial value of the cyclic shift used for the aperiodic SRS may be allocated by a method described below.

1) The initial value may be allocated by a parameter to indicate the cyclic shift for transmitting the aperiodic SRS within the DCI format 4.

2) The initial value may be dynamically allocated independently from the initial value of the cyclic shift used for the periodic SRS.

3) The initial value is set to be variable through a parameter to indicate setting of the initial value of the cyclic shift for transmitting the aperiodic SRS within the DCI format 4 and one of a plurality of RRC configuration sets is dynamically set to implicitly dynamically allocate the cyclic shift.

4) A cyclic shift index indicated in a field to indicate a cyclic shift of a demodulation reference signal (DMRS) within a UL DCI format used most recently may be allocated as the cyclic shift for transmitting the aperiodic SRS.

The cyclic shift used in transmitting the aperiodic SRS may be set by the methods 1), 2), and 3) independently from the cyclic shift of the DMRS. Alternatively, overhead of additional L1/L2 control signaling or higher layer signaling may be reduced by the method 4). In particular, since the aperiodic SRS may be triggered through the DCI format 0 or the DCI format 4 and the field to indicate the cyclic shift of the DMRS is included in the corresponding DCI format, it is easy to reuse the field as the cyclic shift used in transmitting the aperiodic SRS.

Further, spacing of the cyclic shift, between each antenna, used when the aperiodic SRS is transmitted through the plurality of antennas may be additionally defined in the DCI format. As described above, the number of transmission antennas of the UE and the number of antennas used for transmitting the aperiodic SRS, which is determined according to the PUSCH transmission mode may be different from each other. That is, the number of antennas used for transmitting the aperiodic SRS in PUSCH transmission mode 1 is any one of 1, 2, and 4, and the number of antennas used for transmitting the aperiodic SRS is any one of 1 and 2 when two antennas are configured for the PUSCH transmission in PUSCH transmission mode 2 and the number of antennas used for transmitting the aperiodic SRS is any one of 1 and 4 when four antennas are configured for the PUSCH transmission in PUSCH transmission mode 2. As a result, cyclic shift spacing for each antenna may be changed depending on the number of antennas used for transmitting the aperiodic SRS.

The cyclic shift spacing for each antenna may be allocated to be maximum by considering a performance gain for channel estimation when the plurality of antennas are multiplexed by code division multiplexing (CDM). By considering that a maximum value of the number of the cyclic shifts considered at the time of transmitting the aperiodic SRS is 8, when the number of antennas used for transmitting the aperiodic SRS is 2, the cyclic shift spacing for each antenna may be 4 and when the number of antennas used for transmitting the aperiodic SRS is 4, the cyclic shift spacing for each antenna may be 2. As a result, the cyclic shift spacing for each antenna may be implicitly indicated through the number of antennas for transmitting the aperiodic SRS.

Table 10 shows an example of a parameter configuration included in the DCI format 4, which is used to indicate the number of antennas for transmitting the aperiodic SRS.

TABLE 10

| Status | Configurations | Number of antennas |
|---|---|---|
| 1 | According to a configuration of the aperiodic SRS configured by RRC (configuration 0) | 4 |
| 2 | According to a configuration of the aperiodic SRS configured by RRC (configuration 0) | 2 |
| 3 | According to a configuration of the aperiodic SRS configured by RRC (Configuration 0) | 1 |
| 4 | Not activated | |

Referring to Table 10, the parameter to indicate the number of antennas for transmitting the aperiodic SRS configures only the number of antennas.

Table 11 shows another example of the parameter configuration included in the DCI format 4, which is used to indicate the number of antennas for transmitting the aperiodic SRS.

TABLE 11

| Status | Status definition |
|---|---|
| 1 | Aperiodic SRS triggering by com offset and cyclic shift configured by RRC (alternatively, dynamically configured by the DCI format 0 or 4)/the number of antennas = 1 |
| 2 | Aperiodic SRS triggering by com offset and cyclic shift configured by RRC (alternatively, dynamically configured by the DCI format 0 or 4)/the number of antennas = 2 |
| 3 | Aperiodic SRS triggering by com offset and cyclic shift configured by RRC (alternatively, dynamically configured by the DCI format 0 or 4)/the number of antennas = 4 |
| 4 | Not activated |

Referring to Table 11, the parameter to indicate the number of antennas for transmitting the aperiodic SRS configures only the number of antennas and as the parameter, the coin offset and cyclic shift configured by RRC may be used.

Table 12 shows another example of the parameter configuration included in the DCI format 4, which is used to indicate the number of antennas for transmitting the aperiodic SRS.

TABLE 12

| Status | Configurations | Number of antennas |
| --- | --- | --- |
| 1 | According to a configuration of the aperiodic SRS configured by RRC (configuration 0) | Determined depending on the PUSCH transmission mode (2 or 4) |
| 2 | According to a configuration of the aperiodic SRS configured by RRC (configuration 0) | 1 |
| 3 | According to a new configuration of the aperiodic SRS defined by RRC (configuration 1) | Newly set by RRC |
| 4 | Not activated | |

Referring to Table 12, in status 1, the number of antennas for transmitting the aperiodic SRS is set to be the same as the number of antennas for transmitting the PUSCH according to the PUSCH transmission mode. In status 1, the number of antennas for transmitting the aperiodic SRS is independently determined through RRC signaling.

The number of antennas for transmitting the aperiodic SRS may be implicitly indicated through the cyclic shift spacing for each antenna. Table 13 shows an example of a parameter included in the DCI format 4, which is used to indicate the cyclic shift spacing for each antenna that transmits the aperiodic SRS.

TABLE 13

| Status | Configurations | Cyclic shift spacing for each antenna |
| --- | --- | --- |
| 1 | According to a configuration of the aperiodic SRS configured by RRC (configuration 0) | 2 |
| 2 | According to a configuration of the aperiodic SRS configured by RRC (configuration 0) | 4 |
| 3 | According to a configuration of the aperiodic SRS configured by RRC (configuration 0) | 1 |
| 4 | Not activated | |

Table 14 shows an example of a parameter included in the DCI format 4, which is used to indicate the cyclic shift spacing for each antenna that transmits the aperiodic SRS.

TABLE 14

| Status | Status definition |
| --- | --- |
| 1 | Aperiodic SRS triggering by com offset and cyclic shift configured by RRC (alternatively, dynamically configured by the DCI format 0 or 4)/cyclic shift spacing for each antenna = 1 |
| 2 | Aperiodic SRS triggering by com offset and cyclic shift configured by RRC (alternatively, dynamically configured by the DCI format 0 or 4)/cyclic shift spacing for each antenna = 1 |
| 3 | Aperiodic SRS triggering by com offset and cyclic shift configured by RRC (alternatively, dynamically configured by the DCI format 0 or 4)/cyclic shift spacing for each antenna = 1 |
| 4 | Not activated |

Table 15 shows an example of a parameter included in the DCI format 4, which is used to indicate the cyclic shift spacing for each antenna that transmits the aperiodic SRS.

TABLE 15

| Status | Configurations | Cyclic shift spacing for each antenna |
| --- | --- | --- |
| 1 | According to a configuration of the aperiodic SRS configured by RRC (configuration 0) | Determined depending on the PUSCH transmission mode (2 or 4) |
| 2 | According to a configuration of the aperiodic SRS configured by RRC (configuration 0) | 1 |
| 3 | According to a new configuration of the aperiodic SRS defined by RRC (configuration 1) | Newly set by RRC |
| 4 | Not activated | |

Referring to Table 15, in status 1, the cyclic shift spacing for each antenna that transmits the aperiodic SRS is set depending on the number of antennas for transmitting the PUSCH according to the PUSCH transmission mode. In status 3, the cyclic shift spacing for each antenna that transmits the aperiodic SRS is independently determined through the RRC signaling.

Figure 7:
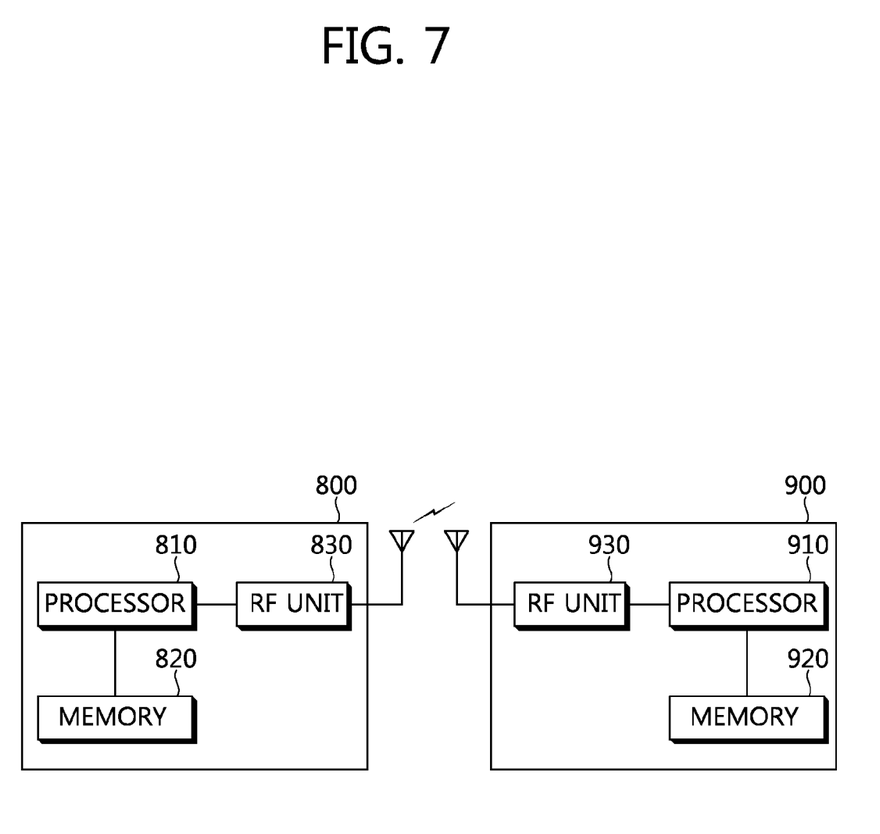
FIG. 7 is a block diagram showing wireless communication system to implement an embodiment of the present invention.

FIG. 7 is a block diagram showing wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for transmitting, by a user equipment (UE), an aperiodic sounding reference signal (SRS) in a wireless communication system, the method comprising:
    receiving, by the UE, an indication of a transmission mode of a physical uplink shared channel (PUSCH) from a base station through higher layer signaling;
    receiving, by the UE, an SRS parameter indicating a number of antenna ports for transmitting the aperiodic SRS from the base station through a physical downlink control channel (PDCCH);
    transmitting, by the UE, the aperiodic SRS to the base station through at least one antenna port corresponding to the number of the antenna ports for transmitting the aperiodic SRS,
    wherein the number of antenna ports for transmitting the aperiodic SRS is determined according to the transmission mode of the PUSCH,
    wherein the transmission mode of the PUSCH is either a single antenna port mode indicating that the PUSCH is transmitted via a single antenna port, or a multi antenna ports mode indicating that the PUSCH is transmitted via multi antenna ports,
    wherein the number of antenna ports for transmitting the aperiodic SRS is configured as one of 2 or 4 when the transmission mode of the PUSCH is the single antenna port mode, and
    wherein the SRS parameter is received by being included in a downlink control information (DCI) format 4; and
    receiving, by the UE, a parameter indicating an interval of cyclic shifts of each antenna port for transmitting the aperiodic SRS from the base station through the PDCCH,
    wherein the interval is one of 2 or 4.

2. The method of claim 1, wherein the number of antenna ports for transmitting the aperiodic SRS is configured as one of 1 or 2 if the transmission, mode of the PUSCH is the multi antenna ports mode and the number of antenna ports configured to transmit the PUSCH is 2.

3. The method of claim 1, wherein the number of antenna ports for transmitting the aperiodic SRS is configured as one of 1 or 4 if the transmission mode of the PUSCH is the multi antenna ports mode and the number of antenna ports configured to transmit the PUSCH is 4.

4. The method of claim 1, further comprising:
    receiving, by the UE, a parameter indicating an initial value of a cyclic shift of the antenna port for transmitting the aperiodic SRS from the base station through the PDCCH.

5. The method of claim 4, wherein the parameter indicating the initial value of the cyclic shift of the antenna port for transmitting the aperiodic SRS is configured by 3 bits.

6. The method of claim 1, wherein the interval of cyclic shifts of each antenna port for transmitting the aperiodic SRS is determined to be maximum depending on the number of antenna ports for transmitting the aperiodic SRS.

7. A user equipment in a wireless communication system, the user equipment comprising:
    a memory;
    a radio frequency (RF) unit; and
    a processor coupled to the memory and the RF unit, and configured to:
    control the RF unit to receive an indication of a transmission mode of a physical uplink shared channel (PUSCH) from a base station through higher layer signaling;
    control the RF unit to receive an SRS parameter indicating a number of antenna ports for transmitting the aperiodic SRS from the base station through a physical downlink control channel (PDCCH); and
    control the RF unit to transmit the aperiodic SRS to the base station through at least one antenna port corresponding to the number of the antenna ports for transmitting the aperiodic SRS,
    wherein the number of antenna ports for transmitting the aperiodic SRS is determined according to the transmission mode of the PUSCH,
    wherein the transmission mode of the PUSCH is either a single antenna port mode indicating that the PUSCH is transmitted via a single antenna port, or a multi antenna ports mode indicating that the PUSCH is transmitted via multi antenna ports, wherein the number of antenna ports for transmitting the aperiodic SRS is configured as one of 2 or 4 when the transmission mode of the PUSCH is the single antenna port mode, and
    wherein the SRS parameter is received by being included in a downlink control information (DCI) format 4; and
    control the RF unit to receive a parameter indicating an interval of cyclic shifts of each antenna port for transmitting the aperiodic SRS from the base station through the PDCCH
    wherein the interval is one of 2 or 4.

* * * * *